United States Patent
Cai et al.

(10) Patent No.: US 9,858,230 B2
(45) Date of Patent: Jan. 2, 2018

(54) MULTI-HOST HOT-PLUGGING OF MULTIPLE CARDS

(71) Applicant: Cisco Technology, Inc., San Jose, CA (US)

(72) Inventors: Xiaoguang Cai, Shanghai (CN); Zhen Pan, Shanghai (CN); ChangZheng Liu, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 273 days.

(21) Appl. No.: 14/626,996

(22) Filed: Feb. 20, 2015

(65) Prior Publication Data

US 2016/0246751 A1    Aug. 25, 2016

(51) Int. Cl.
*G06F 13/40*  (2006.01)
*G06F 13/42*  (2006.01)

(52) U.S. Cl.
CPC ...... *G06F 13/4081* (2013.01); *G06F 13/4282* (2013.01)

(58) Field of Classification Search
CPC .............. G06F 13/4063; G06F 13/409; G06F 2213/0024; G06F 2213/0026; G06F 1/185; G06F 13/4031
See application file for complete search history.

(56) References Cited

U.S. PATENT DOCUMENTS

| | | | |
|---|---|---|---|
| 8,958,414 B1* | 2/2015 | Wong | H04L 12/403 370/351 |
| 2001/0055277 A1* | 12/2001 | Steely, Jr. | H04L 47/29 370/236 |
| 2003/0031197 A1* | 2/2003 | Schmidt | G06F 13/1657 370/462 |
| 2004/0243725 A1* | 12/2004 | Yakovlev | G06F 13/4081 710/1 |
| 2006/0047873 A1* | 3/2006 | Bose | G06F 13/4022 710/243 |
| 2007/0239925 A1* | 10/2007 | Koishi | G06F 13/4022 710/316 |
| 2010/0211717 A1* | 8/2010 | Uehara | G06F 13/4022 710/316 |

OTHER PUBLICATIONS

"Hot-Swap in PCIe Based Systems—Application Note AN-701 Preliminary", Integrated Device Technology, Inc., Retrieved from https://www.idt.com/document/apn/701-hot-swap-pcie-based-systems-1, Sep. 16, 2008, 6 pages.

* cited by examiner

*Primary Examiner* — Farley Abad
(74) *Attorney, Agent, or Firm* — Edell, Shapiro & Finnan, LLC

(57) ABSTRACT

Hot-plug actions are enabled in an M-host, N-card system architecture. An arbiter receives status signals from the N hot-pluggable cards, and transfers the status signals to at least some of the M host devices. In response to the status signals indicating a hot-plug action, the arbiter receives at least one host command. The arbiter transfers the host command to one or more of the N hot-pluggable cards according to an arbiter algorithm.

24 Claims, 5 Drawing Sheets

MULTI-HOST HOT-PLUGGING OF MULTIPLE CARDS

TECHNICAL FIELD

The present disclosure relates to arbitrating hot-plug actions between multiple hosts and multiple cards.

BACKGROUND

Host devices can use expansion cards to add functionality over an expansion bus, such as a Peripheral Component Interconnect Express (PCIe) bus. With hot-pluggable cards, the operating system of the host can adapt to removal and/or insertion of cards without requiring a system restart. In one implementation of a hot-plug standard, an attention button is pressed when a user wants to remove a powered PCIe card. Pressing the attention button alerts the operating system of the host that the card will be removed, and allows the operating system to smoothly transition the functions of the card before it is removed. Additionally, a PCIe card may include a Manually-operated Retention Latch (MRL) which must be opened to remove the card. Removing the MRL sends a signal to the host to ensure that the host is prepared for the card to be removed.

More complicated system architectures may involve a host connecting to multiple cards. A PCIe switch may be used to expand the PCIe interface and allow a host to connect to multiple PCIe cards. Additionally, multiple hosts may connect to the same card by changing the Basic Input-Output System (BIOS) of the hosts. Multiple hosts can be connected to PCIe switches, but a dedicated PCIe chip that supports Multi-Root Input/Output Virtualization (MR-IOV) is required.

DESCRIPTION OF EXAMPLE EMBODIMENTS

Overview

In accordance with an example embodiment, hot-plug actions are enabled in a multi-host, multi-card system architecture. An arbiter receives status signals from a plurality of hot-pluggable cards, and transfers the status signals to a plurality of host devices. In response to the status signals indicating a hot-plug action, the arbiter receives at least one host command. The arbiter transfers the host command to one or more of the hot-pluggable cards according to an arbiter algorithm.

Detailed Description

Figure 1:
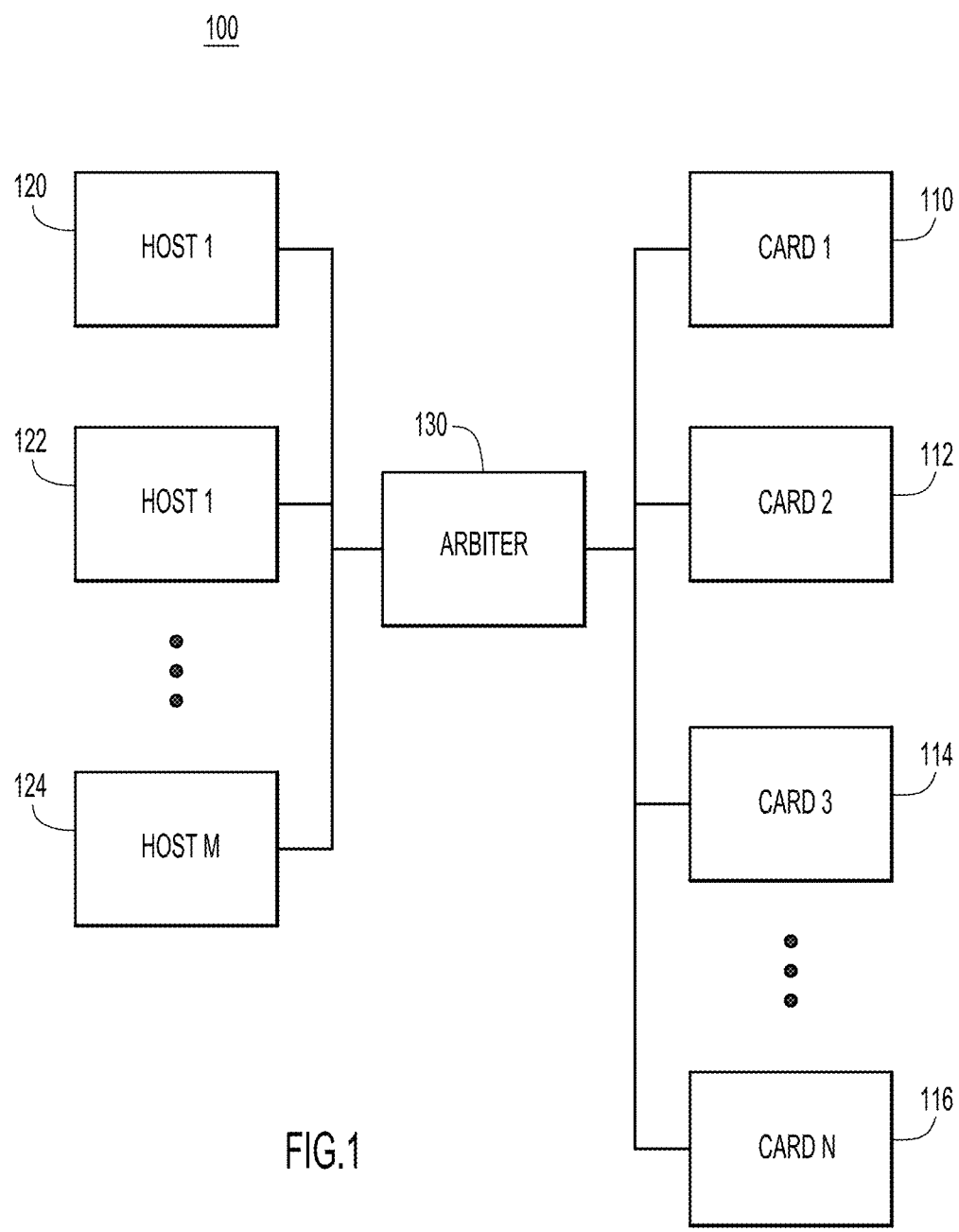
FIG. 1 is a block diagram showing components of a multi-host, multi-card system architecture according to an example embodiment.

Referring to FIG. 1, a simplified block diagram of a multi-host, multi-card system architecture 100 is shown. Expansion card 110 may provide additional functionality (e.g., graphics processing, network interface, data storage interface, etc.) to a host device. Up to N additional cards 112, 114, and 116 may provide the same or different functionality to the same or a different host. Up to M host devices 120, 122, and 124 couple to each of the cards 110, 112, 114, and 116 through an arbiter module 130.

In one example, host device 120 may be a modular server device (e.g., a blade server) stored in a server rack. The host devices 120, 122, and 124 may communicate with the arbiter 130 through an Inter-Integrated Circuit (I2C) bus. The cards 110, 112, 114, and 116 may communicate with the arbiter 130 through a Peripheral Component Interface (PCI)-based interface, such as PCI Express (PCIe). Alternatively, any protocol (e.g., Infiniband, StarFabric, etc.) that allows for hot-pluggable cards may be used by the cards 110, 112, 114, and 116 to communicate with the arbiter 130.

Figure 2:
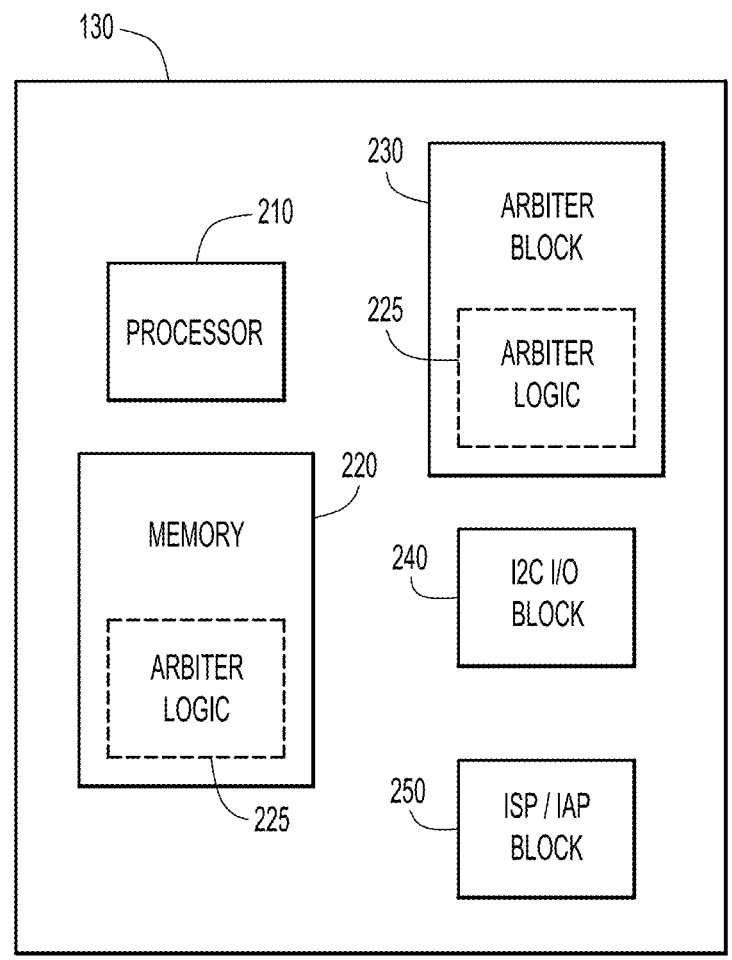
FIG. 2 is a simplified block diagram of an arbiter device used to coordinate communications between multiple hosts and multiple cards according to an example embodiment.

Referring now to FIG. 2, a simplified block diagram of an arbiter device 130 is shown. The arbiter 130 includes a processor 210 to process instructions relevant to the operations of the device, and memory 220 to store a variety of data and software instructions, including arbiter logic 225. The arbiter 130 also includes an arbiter block 230, which may also contain arbiter logic 225, to arbitrate communications to and from the expansion cards according to an algorithm defined in arbiter logic 225. The arbiter 130 further includes an I2C input/output (I/O) block 240 configured to communicate with the host devices through one or more I2C buses. The arbiter 130 includes an In System Programming/In Application Programming (ISP/IAP) block 250 configured to receive any updates to the firmware of the arbiter device 130. The ISP/IAP block 250 may also receive and process updates to the algorithm in arbiter logic 225.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software (e.g., the emergency call logic) comprising computer executable instructions and when the software is executed (by the processor 210) it is operable to perform the operations described herein.

Figure 3:
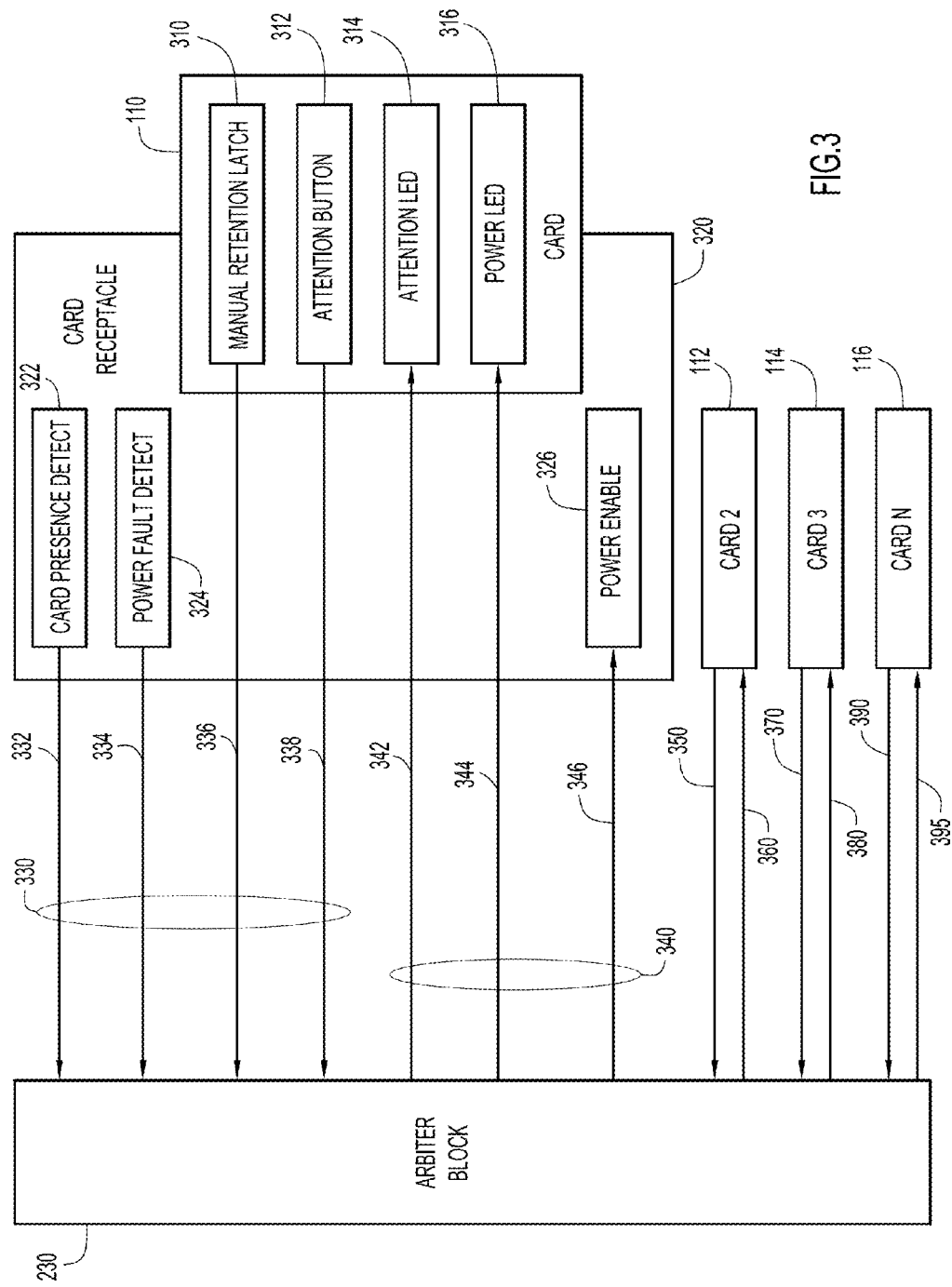
FIG. 3 is a simplified block diagram showing the communications between an arbiter and cards according to an example embodiment.

Referring now to FIG. 3, a simplified block diagram of a card 110 and signals between the card 110 and the arbiter block 230 are shown. In addition to any functionality that the card 110 performs, the card 110 includes a manual retention latch (MRL) 310 that is opened to physically remove the card 110. The card 110 also includes an attention button 312 to notify a host that a hot-plug action is desired for card 110. The attention light emitting diode (LED) 314 shows the user the status of the hot-plug action request by turning on, turning off, or blinking. The power LED 316 shows the user the status of the power supply to the card 110.

Card 110 fits into a card receptacle 320 that couples the card 110 to the arbiter block 230. The card receptacle 320 includes a card presence detector 322 to detect the presence of card 110 in the receptacle 320. Power fault detector 324 detects any power fault that prevents power from being provided to the card 110 through the receptacle 320. Card receptacle 326 may also include a power enable module 326 that receives a command, though arbiter block 230, from a host that enables power to be supplied to the card 110 through the receptacle 320. In other examples, some functionality of the card presence detector 322 and/or the power fault detector 324 may be included in the card 110. Similarly, some functionality of the MRL 310 may be included in the card receptacle 320.

In one example, the card 110 sends a plurality of status signals 330 to the arbiter block 230. The status signals may include a card presence signal 332 from the card presence detector 322, a power fault signal 334 from the power fault detector 324, an MRL signal 336 from the MRL 310, and an attention signal 338 from the attention button 312. Additionally, the arbiter block 230 may send a plurality of host commands 340 that have been received from one or more hosts (not shown in FIG. 3). The host commands 340 may include an attention LED command 342 sent to the attention LED 314, a power LED command 344 to the power LED 316, and a power enable command 346 to the power enable module 326.

In another example, the card receptacle 320 may provide some stand-by power to the card 110 even when the power enable command 346 is asserted. The stand-by power may be used to enable the card 110 to assist in providing the card presence signal 332, power fault signal 334, and/or MRL signal 336.

Though only the communications to/from card 110 are explicitly shown in FIG. 3, the other cards 112, 114, and 116 send and receive similar communications from the arbiter block 230. Card 112 sends the status signals 350 and receives the host commands 360. Card 114 sends the status signals 370 and receives the host commands 380. Card 116 sends the status signals 390 and receives the host commands 395.

Figure 4:
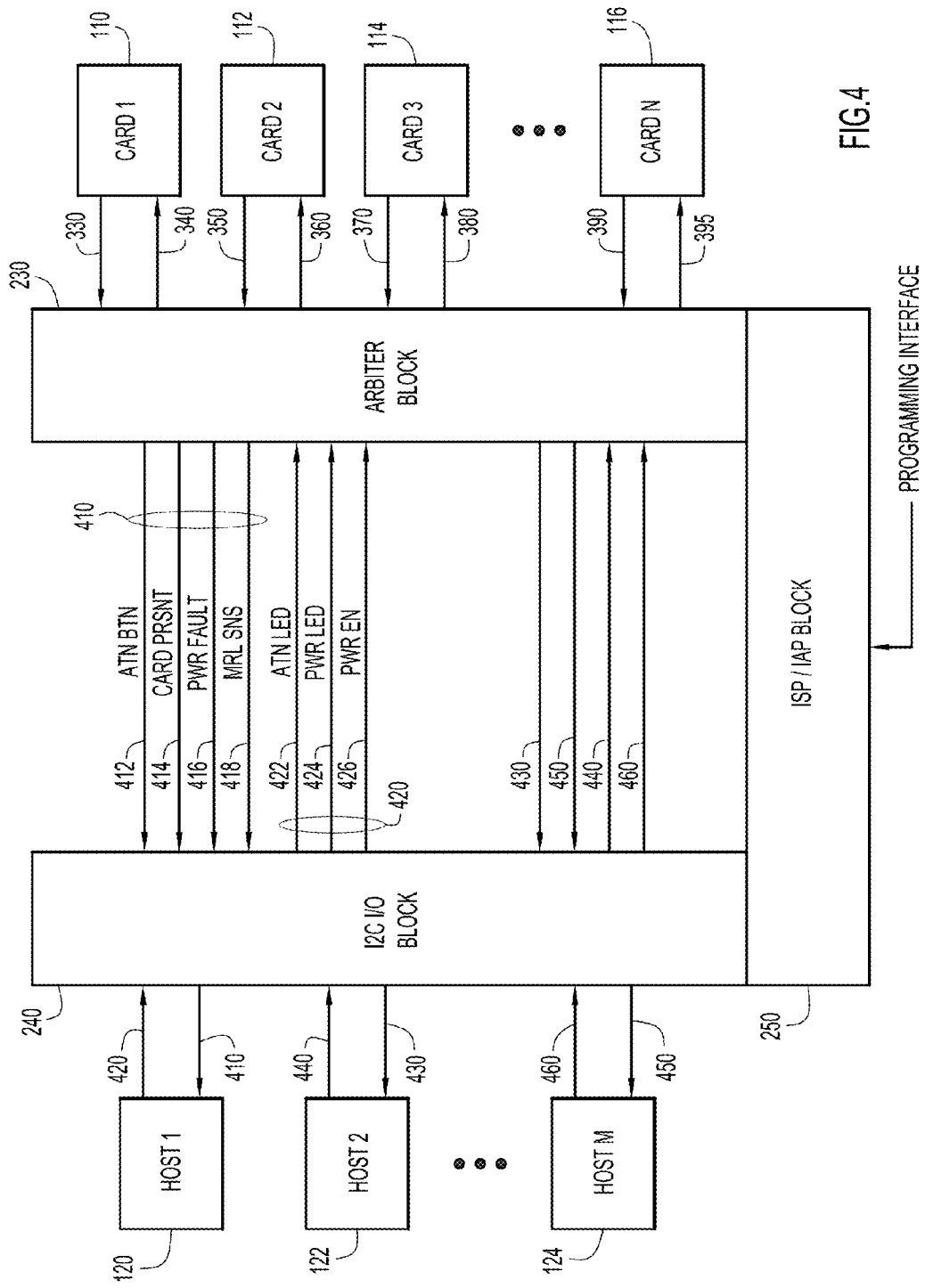
FIG. 4 is a simplified block diagram showing the communications between an arbiter and hosts according to an example embodiment.

Referring now to FIG. 4, a simplified block diagram shows the communications between the arbiter and the host devices. The arbiter block 230 sends status signals 410 through the I2C I/O block 240 to host 120. The status signals 410 may include an attention signal 412, a card presence signal 414, a power fault signal 416, and a MRL sense signal 418. The host 120 responds with host commands 420, which may include an attention LED command 422, a power LED command 424, and a power enable command 426. Arbiter block 230 also sends status signals 430 to host 122, and receives host commands 440 from host 122. Further, arbiter block 230 sends status signals 450 to host 124 and receives host commands 460 from host 124. The ISP/IAP block 250 is shown coupled to both the I2C I/O block 240 and arbiter block 230 and may receives updates from a separate programming interface. The updates received through block 250 may update the firmware of the I2C I/O block 240 and/or update the algorithm in arbiter block 230 that determines which status signals and host commands are transmitted to the hosts 120, 122, 124 and the cards 110, 112, 114, 116, respectively.

In one example, the algorithm of arbiter block 230 may be operate according to a truth table when determining which status signals 410, 430, and 450 to send to the hosts 120, 122, and 124 based on the input of status signals 330, 350, 370, and 390 from cards 110, 112, 114, and 116. A second truth table may be used to determine which host commands 340, 360, 380, and 395 are to be sent to cards 110, 112, 114, and 116 based on the input of host commands 420, 440, and 460 from hosts 120, 122, and 124. For an arbitrary M hosts and N cards, a simple truth table that transfers all of the status signals from the cards to all of the hosts is shown below in Table 1.

TABLE 1

Truth table directing status signals from N cards to M hosts

| Input Source | Signal | Output To Host 1 | Output To Host 2 | ... | Output To Host M |
|---|---|---|---|---|---|
| Card 1 | ATN_BTN | ATN_BTN_CRD1 | ATN_BTN_CRD1 | ... | ATN_BTN_CRD1 |
| | PRSNT | PRSNT_CRD1 | PRSNT_CRD1 | | ... PRSNT_CRD1 |
| | PWR_FLT | PWR_FLT_CRD1 | PWR_FLT_CRD1 | ... | PWR_FLT_CRD1 |
| | MRL_SNS | MRL_CRD1 | MRL_CRD1 | | ... MRL_CRD1 |
| Card 2 | ATN_BTN | ATN_BTN_CRD2 | ATN_BTN_CRD2 | ... | ATN_BTN_CRD2 |
| | PRSNT | PRSNT_CRD2 | PRSNT_CRD2 | | ... PRSNT_CRD2 |
| | PWR_FLT | PWR_FLT_CRD2 | PWR_FLT_CRD2 | ... | PWR_FLT_CRD2 |
| | MRL_SNS | MRL_CRD2 | MRL_CRD2 | | ... MRL_CRD2 |
| ... | ... | ... | ... | ... ... | ... |
| Card N | ATN_BTN | ATN_BTN_CRDN | ATN_BTN_CRDN | ... | ATN_BTN_CRDN |
| | PRSNT | PRSNT_CRDN | PRSNT_CRDN | | ... PRSNT_CRDN |
| | PWR_FLT | PWR_FLT_CRDN | PWR_FLT_CRDN | ... | PWR_FLT_CRDN |
| | MRL_SNS | MRL_CRDN | MRL_CRDN | | ... MRL_CRDN |

Tables 2A, 2B, 2C, 3, and 4, below, show examples of truth tables that determine host commands to send to each of the cards based on host commands from each of the hosts. In tables 2A, 2B, 2C, 3, and 4, a value of "X" is used to show an input of either an ON or OFF command, and a value of "BLINK" shows a command that causes an LED to blink, which may be used to show a transition state, e.g., of a hot-plug action.

TABLE 2A

Truth table directing power enable commands from M hosts to N cards

| Input | | | | Output | |
|---|---|---|---|---|---|
| Host1 PWR_EN | Host2 PWR_EN | ... | HostM PWR_EN | Card1 PWR_EN | ... CardN PWR_EN |
| X | X | ... | OFF | OFF | ... OFF |
| ... | ... | ... | ... | ... | ... ... |
| X | OFF | ... | X | OFF | ... OFF |
| OFF | X | ... | X | OFF | ... OFF |
| ON | ON | ... | ON | ON | ... ON |

Table 2A depicts truth table logic that directs the arbiter 230 to transfer the power enable command to all of the cards only if all of the hosts have sent a power enable command. If any of the hosts have command disabling the power enable module, i.e., sent a power enable command with an OFF value, then the arbiter will disable the power enable module for all of the attached cards.

TABLE 2B

Truth table directing power enable commands from M hosts to N cards accounting for card presence

| Input | | | Output | |
|---|---|---|---|---|
| Host1 PWR_EN | Card1 PRSNT | ... CardN PRSNT | Card1 PWR_EN | ... CardN PWR_EN |
| X | OFF | ... OFF | OFF | ... OFF |
| OFF | ON | ... X | OFF | ... OFF |
| OFF | OFF | ... ON | OFF | ... OFF |

TABLE 2B-continued

Truth table directing power enable commands from M hosts to N cards accounting for card presence

| Input | | | Output | |
|---|---|---|---|---|
| Host1 PWR_EN | Card1 PRSNT | ... CardN PRSNT | Card1 PWR_EN | ... CardN PWR_EN |
| ON | OFF | ... ON | OFF | ... ON |
| ON | ON | ... OFF | ON | ... OFF |
| ON | ON | ... ON | ON | ... ON |

In one example, the arbiter 230 may monitor the card presence signals to determine whether to direct the power enable commands to individual cards, as shown in Table 2B. This allows the arbiter 230 to avoid providing power to card receptacles with no cards in them.

TABLE 2C

Truth table directing power enable commands from M hosts to N cards accounting for card presence and attention signals

| Input | | | | | Output | |
|---|---|---|---|---|---|---|
| Host1 PWR_EN | Card1 ATN | Card1 PRSNT | ... CardN ATN | CardN PRSNT | Card1 PWR_EN | ... CardN PWR_EN |
| X | OFF | OFF | ... OFF | OFF | OFF | ... OFF |
| X | OFF | ON | ... OFF | OFF | ON | ... OFF |
| X | OFF | OFF | ... OFF | ON | OFF | ... ON |
| X | OFF | ON | ... OFF | ON | ON | ... ON |
| OFF | ON | ON | ... OFF | OFF | OFF | ... OFF |
| ON | ON | ON | ... OFF | OFF | ON | ... OFF |
| OFF | ON | ON | ... OFF | ON | OFF | ... ON |
| OFF | OFF | OFF | ... ON | ON | OFF | ... OFF |
| ON | OFF | OFF | ... ON | ON | OFF | ... ON |
| OFF | OFF | ON | ... ON | ON | ON | ... OFF |
| OFF | ON | ON | ... ON | ON | OFF | ... OFF |
| ON | X | ON | ... X | ON | ON | ... ON |

In another example, the arbiter 230 may monitor the card attention signals in addition to card presence signals to determine whether to direct the power enable commands to individual cards, as shown in Table 2C. This allows the arbiter 230 to only remove power to cards that are going to be removed, overriding host commands to remove power from all of the cards any time a single card is to be removed. Additionally, this allows the arbiter 230 to override a host that defaults to disabling power if there is no card present, preventing the host from disabling power to all of the cards any time any of the card receptacles are empty.

TABLE 3

Truth table directing power LED commands from M hosts to N cards

| Input | | | Output | |
|---|---|---|---|---|
| Host1 PWR_LED | Host2 PWR_LED | ... HostM PWR_LED | Card1 PWR_LED | ... CardN PWR_LED |
| OFF | OFF | ... OFF | OFF | ... OFF |
| X | X | ... BLINK | BLINK | ... BLINK |
| ... | ... | ... ... | BLINK | ... BLINK |
| X | BLINK | ... X | BLINK | ... BLINK |
| BLINK | X | ... X | BLINK | ... BLINK |
| X | X | ... ON | ON | ... ON |
| ... | ... | ... ... | ON | ... ON |
| X | ON | ... X | ON | ... ON |
| ON | X | ... X | ON | ... ON |

Table 3 depicts truth table logic for an algorithm that directs the arbiter to transfer a power LED ON command to all of the cards if any of the hosts sends a power LED ON command, as long as none of the hosts sends a power LED BLINK command. If any of the hosts sends a power LED BLINK command, then the arbiter sends a power LED BLINK command to all of the attached cards. If all of the hosts send a power LED OFF command, then the arbiter sends a power LED OFF command to all of the attached cards.

TABLE 4

Truth table directing attention LED commands from M hosts to N cards

| Input | | | Output | |
| --- | --- | --- | --- | --- |
| Host1 ATN_LED | Host2 ATN_LED | ... HostM ATN_LED | Card1 ATN_LED | ... CardN ATN_LED |
| OFF | OFF | ... OFF | OFF | ... OFF |
| X | X | ... BLINK | BLINK | ... BLINK |
| ... | ... | ... ... | BLINK | ... BLINK |
| X | BLINK | ... X | BLINK | ... BLINK |
| BLINK | X | ... X | BLINK | ... BLINK |
| X | X | ... ON | ON | ... ON |
| ... | ... | ... ... | ON | ... ON |
| X | ON | ... X | ON | ... ON |
| ON | X | ... X | ON | ... ON |

Table 4 depicts truth table logic of an algorithm for directing attention LED commands in a similar manner as Table 3 directs power LED commands. That is, Table 4 shows an algorithm that directs the arbiter to transfer an attention LED ON command to all of the cards if any of the hosts sends an attention LED ON command, as long as none of the hosts sends an attention LED BLINK command. If any of the hosts sends an attention LED BLINK command, then the arbiter sends an attention LED BLINK command to all of the attached cards. If all of the hosts send an attention LED OFF command, then the arbiter sends an attention LED OFF command to all of the attached cards.

Figure 5:
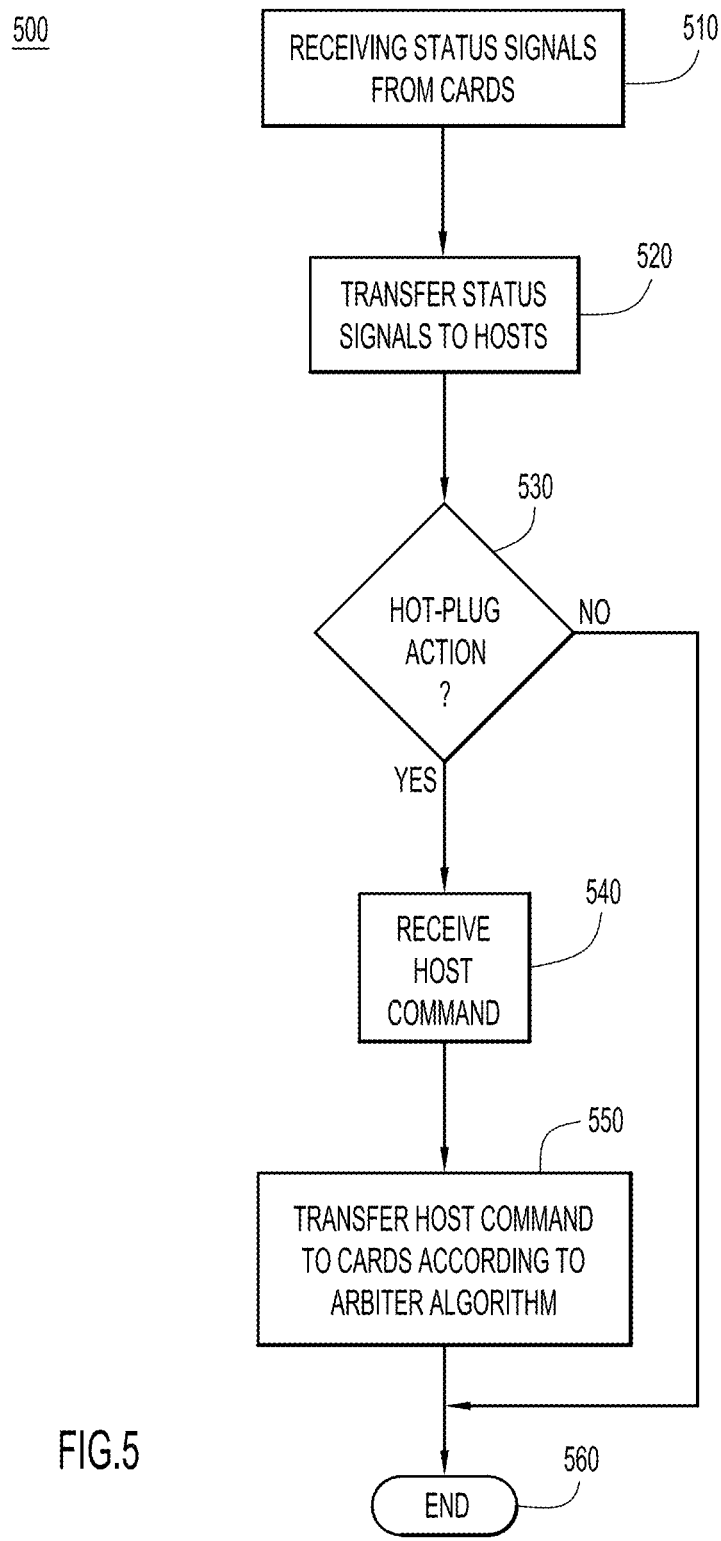
FIG. 5 is a flow diagram illustrating the operations in an arbiter that enable the multi-host, multi-card system according to an example embodiment.

Referring now to FIG. 5, a flow chart shows the operations performed by the arbiter during a hot-plug action according to an example embodiment. The arbiter receives one or more status signals from a plurality of cards at 510, and transfers the status signals to a plurality of hosts at 520. If the arbiter receives a status signal (e.g., attention signal 338) indicating an impending hot-plug action, as determined at 530, then the arbiter waits to receive a host command at 540. The arbiter transfers the host command to the cards according to an arbiter algorithm at 550. After the card receives the host command and completes the hot-plug action, the process ends at 560. The hosts may be informed that the hot-plug action is complete, e.g., by an updated status signal from the card.

In one example, all of the status signals from all of the cards are transferred to all of the hosts. Alternatively, some of the status signals may be selectively transferred to some or all of the hosts. In another example, the host command from the host may be transferred to one or all of the cards attached to the arbiter.

In summary, the techniques presented herein provide for a hot-plug architecture for a multi-host, multi-card system. In one example presented above, an I2C interface is used for each host, and an arbiter is used to resolve the details of communicating signals and commands between the cards and hosts without the need to alter the BIOS of any of the hosts. Effectively, each host can communicate with all of the expansion cards and track any hot-plug actions by any of the cards as if it were a single host. That is, none of the hosts are required to be altered to account for other hosts communicating with the cards or allowing hot-plug actions. The arbiter assumes responsibility for ensuring that the hot-plug actions from any card are reflected in the operating system of each host. Additionally, since the arbiter communicates with the hosts through I2C interfaces, and not through the back plane signal connection, the multi-host, multi-card system can be simpler and more robust. Further, the arbiter algorithm and I/O firmware can be updated in real time through a simple programming interface.

In one form, a method is provided for enabling hot-plug actions in a multi-host, multi-card system architecture. An arbiter receives status signals from a plurality of hot-pluggable cards, and transfers the status signals to a plurality of host devices. In response to the status signals indicating a hot-plug action, the arbiter receives at least one host command. The arbiter transfers the host command to one or more of the hot-pluggable cards according to an arbiter algorithm.

In another form, an apparatus is provided for enabling a multi-host, multi-card system architecture. The apparatus includes an Inter-Integrated Circuit (I2C) input/output (I/O) module and an arbiter module. The I2C I/O module enables the apparatus to communicate with a plurality of host devices. The arbiter module is configured to receive status signals form a plurality of hot-pluggable cards and transfer the status signals to the host devices through the I2C I/O module. In response to the status signals indicating a hot-plug action, the arbiter module receives at least one host command through the I2C I/O module. The arbiter module transfers the host command to one or more of the hot-pluggable cards according to an arbiter algorithm.

In a further form, a system is provided for a multi-host, multi-card architecture. The system comprises a plurality of hot-pluggable cards, a plurality of host devices to interact with the plurality of hot-pluggable cards, and an arbiter module to mediate the interactions between the cards and the host devices. Each of the hot-pluggable cards produces a status signal, which is received by the arbiter module. The arbiter module transfers the status signals to the host devices. In response to the status signals indicating a hot-plug action, the arbiter module receives at least one host command. The arbiter module transfers the host command to one or more of the hot-pluggable cards according to an arbiter algorithm.

The above description is intended by way of example only.

What is claimed is:

1. A method comprising:
receiving status signals from a plurality of hot-pluggable cards;
transferring the status signals to a plurality of host devices;
in response to the status signals indicating a hot-plug action, receiving one or more host commands;
selecting a particular host command according to an arbiter algorithm based on a particular combination of the one or more host commands and the status signals; and
transferring the particular host command to one or more of the hot-pluggable cards according to the arbiter algorithm.

2. The method of claim 1, further comprising receiving an updated status signal indicating that the hot-plug action is complete, and transferring the updated status signal to the plurality of host devices.

3. The method of claim 1, further comprising updating the arbiter algorithm.

4. The method of claim 1, wherein the status signals include an attention signal, a presence signal, a power fault signal, and a manual retention latch signal.

5. The method of claim 1, wherein the one or more host commands include a power enable on command, a power enable off command, a power light on command, a power light blinking command, a power light off command, an attention light on command, an attention light blinking command, or an attention light off command.

6. The method of claim 5, wherein the arbiter algorithm directs the power enable on command to be transferred to the hot-pluggable cards only when power enable on commands have been received from all of the host devices.

7. The method of claim 5, wherein the arbiter algorithm directs the power light on command to be transferred to the hot-pluggable cards when the power light on command has been received from at least one of the host devices and when the power light blinking command has not been received from any of the host devices.

8. The method of claim 5, wherein the arbiter algorithm directs the power light blinking command to be transferred to the hot-pluggable cards when the power light blinking command has been received from at least one of the host devices.

9. An apparatus comprising:
an Inter-Integrated Circuit (I2C) input/output (I/O) module to communicate with a plurality of host devices; and
an arbiter module configured to:
receive status signals from a plurality of hot-pluggable cards;
transfer the status signals to the host devices through the I2C I/O module;
in response to the status signals indicating a hot-plug action, receive one or more host commands through the I2C I/O module;
select a particular host command according to an arbiter algorithm based on a particular combination of the one or more host commands and the status signals; and
transfer the particular host command to one or more of the hot-pluggable cards according to the arbiter algorithm.

10. The apparatus of claim 9, wherein the arbiter module is further configured to:
receive an updated status signal indicating that the hot-plug action is complete; and
transfer the updated status signal to the plurality of host devices.

11. The apparatus of claim 9, further comprising an In System Programming/In Application Programming (ISP/IAP) module to receive an update of the arbiter algorithm and implement the update of the arbiter algorithm in the arbiter module.

12. The apparatus of claim 9, wherein the status signals include an attention signal, a presence signal, a power fault signal, and a manual retention latch signal.

13. The apparatus of claim 9, wherein the one or more host commands include a power enable on command, a power enable off command, a power light on command, a power light blinking command, a power light off command, an attention light on command, an attention light blinking command, or an attention light off command.

14. The apparatus of claim 13, wherein the arbiter module directs the power enable on command to be transferred to the hot-pluggable cards only when power enable on commands have been received from all of the host devices.

15. The apparatus of claim 13, wherein the arbiter module directs the power light on command to be transferred to the hot-pluggable cards when the power light on command has been received from at least one of the host devices and when the power light blinking command has not been received from any of the host devices.

16. The apparatus of claim 13, wherein the arbiter module directs the power light blinking command to be transferred to the hot-pluggable cards when the power light blinking command has been received from at least one of the host devices.

17. A system comprising:
a plurality of hot-pluggable cards, each of the hot-pluggable cards producing a status signal;
a plurality of host devices to interact with the plurality of hot-pluggable cards; and
an arbiter module to mediate interactions between the hot-pluggable cards and the host devices by:
receiving the status signals from the hot-pluggable cards;
transferring the status signals to the host devices;
in response to the status signals indicating a hot-plug action, receiving one or more host commands;
selecting a particular host command according to an arbiter algorithm based on a particular combination of the one or more host commands and the status signals; and
transferring the particular host command to one or more of the hot-pluggable cards according to the arbiter algorithm.

18. The system of claim 17, wherein the arbiter module further receives an updated status signal indicating that the hot-plug action is complete, and transfers the updated status signal to the plurality of host devices.

19. The system of claim 17, wherein the arbiter module receives an update to the arbiter algorithm.

20. The system of claim 17, wherein the status signals include an attention signal, a presence signal, a power fault signal, and a manual retention latch signal.

21. The system of claim 17, wherein the one or more host commands include a power enable on command, a power enable off command, a power light on command, a power light blinking command, a power light off command, an attention light on command, an attention light blinking command, or an attention light off command.

22. The system of claim 17, wherein the arbiter module directs the power enable on command to be transferred to the hot-pluggable cards only when power enable on commands have been received from all of the host devices.

23. The system of claim 17, wherein the arbiter module directs the power light on command to be transferred to the hot-pluggable cards when the power light on command has been received from at least one of the host devices and when the power light blinking command has not been received from any of the host devices.

24. The system of claim 17, wherein the arbiter module directs the power light blinking command to be transferred to the hot-pluggable cards when the power light blinking command has been received from at least one of the host devices.

* * * * *